US010783621B2

United States Patent
Li et al.

(10) Patent No.: US 10,783,621 B2
(45) Date of Patent: Sep. 22, 2020

(54) METHOD AND APPARATUS FOR PROCESSING HIGH DYNAMIC RANGE IMAGE, AND TERMINAL DEVICE

(71) Applicant: Huawei Technologies Co., Ltd., Shenzhen (CN)

(72) Inventors: Meng Li, Beijing (CN); Hai Chen, Shenzhen (CN); Xiaozhen Zheng, Shenzhen (CN); Jianhua Zheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 227 days.

(21) Appl. No.: 15/986,184

(22) Filed: May 22, 2018

(65) Prior Publication Data

US 2018/0268529 A1 Sep. 20, 2018

Related U.S. Application Data

(63) Continuation of application No. PCT/CN2015/098502, filed on Dec. 23, 2015.

(30) Foreign Application Priority Data

Dec. 15, 2015 (WO) .................. PCT/CN2015/097414

(51) Int. Cl.
*G06T 5/00* (2006.01)
*H04N 19/124* (2014.01)
(Continued)

(52) U.S. Cl.
CPC ............ *G06T 5/009* (2013.01); *H04N 5/2351* (2013.01); *H04N 5/23229* (2013.01);
(Continued)

(58) Field of Classification Search
CPC ......... G06T 5/009; G06T 5/008; G06T 5/007; G06T 5/002; G06T 2207/20208;
(Continued)

(56) References Cited

U.S. PATENT DOCUMENTS 5,089,982 A 2/1992 Gran et al.
7,626,614 B1 12/2009 Marcu
(Continued)

FOREIGN PATENT DOCUMENTS

CN 102696220 A 9/2012
CN 103391437 A 11/2013
(Continued)

OTHER PUBLICATIONS

Machine Translation and Abstract of Chinese Publication No. CN103391437, Nov. 13, 2013, 15 pages.
(Continued)

*Primary Examiner* — Dwayne D Bost
*Assistant Examiner* — Stephen M Brinich
(74) *Attorney, Agent, or Firm* — Conley Rose, P.C.

(57) ABSTRACT

A method and an apparatus for processing a high dynamic range (HDR) image, and a terminal device to improve quantization quality, where the method includes obtaining brightness information of an image, processing the brightness information to obtain processed image information, quantizing the processed image information to obtain quantized image information, and encoding the quantized image information to obtain encoded image information.

20 Claims, 6 Drawing Sheets

(51) Int. Cl.
  *H04N 19/85* (2014.01)
  *H04N 5/235* (2006.01)
  *H04N 19/44* (2014.01)
  *H04N 5/232* (2006.01)
(52) U.S. Cl.
  CPC .......... *H04N 19/124* (2014.11); *H04N 19/44* (2014.11); *H04N 19/85* (2014.11); *G06T 2207/20208* (2013.01)
(58) Field of Classification Search
  CPC ........ G06T 2207/20182; H04N 19/124; H04N 19/126; H04N 19/44; H04N 19/85; H04N 19/86; H04N 5/23229
  USPC ................. 382/162–167, 232, 239, 251, 253
  See application file for complete search history.

(56) References Cited

U.S. PATENT DOCUMENTS

| | | | |
|---|---|---|---|
| 2005/0117799 A1 | 6/2005 | Fuh et al. | |
| 2006/0017597 A1 | 1/2006 | Jaspers | |
| 2009/0317017 A1 | 12/2009 | Au et al. | |
| 2012/0141029 A1 | 6/2012 | Cha et al. | |
| 2012/0201456 A1 | 8/2012 | El-Mahdy et al. | |
| 2014/0029665 A1 | 1/2014 | Damkat | |
| 2014/0363093 A1 | 12/2014 | Miller et al. | |
| 2015/0103919 A1 | 4/2015 | Hattori et al. | |
| 2015/0243200 A1 | 8/2015 | Pan | |
| 2015/0249832 A1 | 9/2015 | Ten et al. | |
| 2015/0358646 A1* | 12/2015 | Mertens | H04N 1/6058 382/166 |
| 2016/0165256 A1* | 6/2016 | Van Der Vleuten | G09G 5/10 375/240.01 |
| 2016/0371822 A1* | 12/2016 | Le Pendu | H04N 19/117 |
| 2017/0127069 A1 | 5/2017 | Mertens | |

FOREIGN PATENT DOCUMENTS

| | | |
|---|---|---|
| CN | 103563376 A | 2/2014 |
| CN | 103843032 A | 6/2014 |
| CN | 104471939 A | 3/2015 |
| CN | 104813666 A | 7/2015 |
| EP | 1372340 A2 | 12/2003 |
| GB | 2408872 A | 6/2005 |
| GB | 2526047 A | 11/2015 |
| JP | 2620423 B2 | 6/1997 |
| TW | I235608 B | 7/2005 |
| WO | 2015128603 A1 | 9/2015 |

OTHER PUBLICATIONS

Machine Translation and Abstract of Taiwanese Publication No. TWI235608, Part 1, Jul. 1, 2005, 2 pages.
Machine Translation and Abstract of Taiwanese Publication No. TWI235608, Part 2, Jul. 1, 2005, 4 pages.
Ma, W., et al, "A Survey of HDRI Range Compression Technology," Journal of Communication University of China (Science and Technology), vol. 14, No. 4, Dec. 31, 2007, 8 pages.
Wan, X., et al, "A Survey of Visualization of High-Dynamic-Range Images," China Printing and Packaging Study, Apr. 11, 2009, 6 pages.
Yang, K., et al, "High Dynamic Range Images and Tone Mapping Operator," Acta Automatica Sinica, vol. 35, No. 2, Feb. 15, 2009, 10 pages.
Schlick, C., "Quantization Techniques for Visualization of High Dynamic Range Pictures," Proceedings of the 5th Eurographics Workshop on Rendering, Dec. 31, 1994, 13 pages.
"Reference electro-optical transfer function for flat panel displays used in HDTV studio production," Recommendation ITU-R BT.1886, Mar. 2011, 7 pages.
"The present state of ultra-high definition television," Rep. ITU-R BT.2246-5, Jul. 2015, 92 pages.
Luthra, A., "Call for Evidence (CfE) for HDR and WCG Video Coding," ISO/IEC JTC1/SC29/WG11 MPEG2014/N15083, Feb. 2015, 46 pages.
Foreign Communication From a Counterpart Application, PCT Application No. PCT/CN2015/097414, International Search Report dated Aug. 26, 2016, 8 pages.
Foreign Communication From a Counterpart Application, PCT Application No. PCT/CN2015/097414, Written Opinion dated Aug. 26, 2016, 4 pages.
Foreign Communication From a Counterpart Application, PCT Application No. PCT/CN2015/098502, English Translation of International Search Report dated Aug. 31, 2016, 3 pages.
Sharp Corporation "Performance investigation of high dynamic range and wide colour gamut video coding techniques," XP030100749, COM 16-C 1030-E, Sep. 29, 2015, 27 pages.
Foreign Communication From a Counterpart Application, European Application No. 15910606.1, Extended European Search Report dated Oct. 25, 2018, 11 pages.
Foreign Communication From a Counterpart Application, Chinese Application No. 201580085179.8, Chinese Office Action dated Jul. 2, 2019, 7 pages.

* cited by examiner

METHOD AND APPARATUS FOR PROCESSING HIGH DYNAMIC RANGE IMAGE, AND TERMINAL DEVICE

CROSS-REFERENCE TO RELATED APPLICATIONS

This application is a continuation of International Patent Application No. PCT/CN2015/098502 filed on Dec. 23, 2015, which claims priority to International Patent Application PCT/CN2015/097414 filed on Dec. 15, 2015. The disclosures of the aforementioned applications are hereby incorporated by reference in their entireties.

TECHNICAL FIELD

The present disclosure relates to the field of image processing technologies, and in particular, to a method and an apparatus for processing a high dynamic range (HDR) image, and a terminal device.

BACKGROUND

In a digital image, a dynamic range is a ratio of a maximum grayscale value to a minimum grayscale value in a range in which the image can be displayed. For a natural scene in a real world, if brightness is in a range of $10^{-3}$ nits to $10^4$ nits, a brightness range of the real world may reach $10^7$, and is referred to as an HDR. Currently, in most color digital images, each of red (R), green (G), and blue (B) channels separately uses one byte for storage. In other words, a representation range of each channel is a 0-255 gray scale. That is, a dynamic range of a color digital image is 0-255, and is referred to as a low dynamic range (LDR). An imaging process of a digital camera is actually mapping from the HDR of the real world to the LDR of the image. A conventional method for processing an HDR image includes an HDR image encoding process and an HDR image decoding process. The HDR image encoding process includes performing, using an optical-electro transfer function, non-linear mapping on stored RGB information (the RGB information is brightness information of the real world), quantizing RGB information obtained after the non-linear mapping is performed to obtain 10-bit data, and encoding the 10-bit data. The HDR image decoding process includes decoding the encoded data to obtain the 10-bit data, dequantizing the 10-bit data to obtain the RGB information obtained after the non-linear mapping is performed, transferring, using an electro-optical transfer function, the RGB information obtained after the non-linear mapping is performed into the brightness information of the real world, and outputting transferred RGB information. A Weber score is a main indicator used to measure quantization quality of a curve. A brightness value in each range is obtained using the optical-electro transfer function. A smaller Weber score that is obtained through calculation after a brightness value curve in each range is quantized indicates higher quantization quality of this brightness. If an obtained Weber score is greater than a limit value, stripe noise that a human eye can perceive appears. Brightness information of an image is an optical signal in the real world, may be represented by "L" or "E", usually records a numeric value that is corresponding to a specific color component (for example, R, G, B, or Y), and is generally proportional to light intensity. Optical-electro transfer is performed on the brightness information of the image using the optical-electro transfer function to obtain electrical signal image information. The electrical signal image information obtained after the transfer may be represented by "L'" or "E'", indicating a numeric expression value of an image brightness signal. An electrical signal obtained through the transfer performed using the optical-electro transfer function may include primary colors such as R, G, B, and Y. The brightness information of the image may be expressed in real brightness (for example, 10000 nits), or may be expressed in normalized brightness, for example, based on that maximum brightness 10000 nits is normalized to maximum brightness 1. Electro-optical transfer is performed on input image information (the electrical signal) using the electro-optical transfer function to obtain the brightness information of the image. The brightness information of the image is a restored optical signal in the real world.

An optical-electro transfer function in conventional scheme 1 is proposed based on a brightness perception model of a human eye. The optical-electro transfer function may be:

$R' = \text{PQ\_TF}(\max(0, \min(R/10000,1)));$ $G' = \text{PQ\_TF}(\max(0, \min(G/10000,1)));$ $B' = \text{PQ\_TF}(\max(0, \min(B/10000,1)));$ and $$\text{PQ\_TF}(L) = \left(\frac{c_1 + c_2 L^{m_1}}{1 + c_3 L^{m_1}}\right)^{m_2},$$

where $m_1=0.1593017578125$, $m_2=78.84375$, $c_1=0.8359375$ $c_2=18.8515625$, and $c_3=18.6875$.

A Weber score is a main indicator used to measure quantization quality of a curve. A Weber score shown in FIG. 1A is used as an example. A first curve is a Schreiber threshold in an International Telecommunication Union (ITU) Report BT.2246 standard file. A brightness value in each range is obtained using the optical-electro transfer function. A smaller Weber score that is obtained through calculation after a brightness value curve in each range is quantized indicates higher quantization quality of this brightness. If an obtained Weber score is greater than the Schreiber threshold, stripe noise that a human eye can perceive appears. A second curve includes Weber scores obtained using the optical-electro transfer function in scheme 1. Weber scores, of the second curve, that are obtained when a brightness value is less than 0.1 nits exceed the Schreiber threshold. As a result, an output HDR image generates stripe noise that a human eye can perceive, and cannot meet a quality requirement.

SUMMARY

This application provides a method and an apparatus for processing an HDR image, and a terminal device in order to improve quantization quality.

According to a first aspect, a method for processing an HDR image is provided. The method includes obtaining, by a terminal device, brightness information of an image, performing, by the terminal device, the following processing on the brightness information to obtain processed image information:

$$L' = a\left(\frac{pL}{(p-1)L+1}\right)^m + b,$$

where a, b, m, and p are rational numbers, L is the brightness information of the image, and L' is the processed image information, quantizing, by the terminal device, the processed image information to obtain quantized image information, and encoding, by the terminal device, the quantized image information to obtain encoded image information.

In this technical solution, a dynamic range of a display device is a 0-255 gray scale. A dynamic range of a real world reaches $10^7$. Because a dynamic range concerns brightness information, a brightness range of the display device is not sufficient to represent a brightness domain of the real world. If the entire brightness domain of the real world is simply compressed, in a linear manner, into a brightness domain that the display device can represent, relatively more details are lost at bright and dim ends. In order to overcome this situation, an optical-electro transfer function is proposed. A conventional optical-electro transfer function may be an optical-electro transfer function in scheme 1, as shown in FIG. 1A. A second curve includes Weber scores obtained using the optical-electro transfer function in scheme 1. A fourth curve includes Weber scores obtained using an optical-electro transfer function in this application. It can be learned that Weber scores, of the second curve, that are obtained when a brightness value is less than 0.1 nits exceed a Schreiber threshold, resulting in that an output HDR image generates stripe noise that a human eye can perceive and cannot meet a quality requirement, whereas while meeting the Schreiber threshold, the fourth curve has a brightness value that may reach 10000 nits. Therefore, the method for processing an HDR image provided in this application can improve quantization quality.

The brightness information is expressed in a unit of nits. The brightness information of the image may include brightness information of each channel. For example, when the image is an RGB image, the brightness information may include brightness information of R, G, and B channels, and when the image is an image in a Lab mode, the brightness information may include brightness information of L, a, and b channels. The brightness information may include normalized brightness. For example, brightness of the real world is divided by $10^4$ to obtain the normalized brightness. The normalized brightness is in a range of 0 to 1.

It should be noted that a, b, m, and p are rational numbers. Optionally, a relationship between a and b may be a+b=1. For example, a=1.12672, b=−0.12672, m=0.14, and p=2.2. For another example, a=1.19996, b=−0.19996, m=0.11, and p=1.1. For another example, a=1.17053, b=−0.17053, m=0.12, and p=1.4. For another example, a=1.14698, b=−0.14698, m=0.13, and p=1.8. For another example, a=1.11007, b=−0.11007, m=0.15, and p=2.7. For another example, a=1.13014, b=−0.13014, m=0.14, and p=2.6. Further, the terminal device may perform the following processing on the brightness information to obtain the processed image information $$L' = a\left(\frac{pL}{(p-1)L+1}\right)^m + 1 - a,$$

where a, b, m and p are rational numbers, L is the brightness information of the image, and L' is the processed image information.

Optionally, a relationship between a and b may also be a+b≠1. For example, a=1.11204, b=−0.122042, m=0.15, and p=3. For another example, a=1.09615, b=−0.1161462, m=0.16, and p=3.3. For another example, a=1.12762, b=−0.127622, m=0.14, and p=2.3. For another example, a=1.11204, b=−0.112042, m=0.15, and p=3. For another example, a=1.09615, b=−0.0961462, m=0.16, and p=3.3. It should be noted that a, b, m, and p are preset rational numbers, and may be an empirical value determined by a research and development person, or may be a value derived from a Weber score in an experiment process. This is not restricted in embodiments of the present disclosure.

In a possible design, the terminal device may combine the method for processing an HDR image provided in this application with a conventional HDR video encoding framework to improve resource utilization while improving quantization quality. The conventional HDR video encoding framework may include an optical-electro transfer module, a space transfer module, a quantization module, and an encoding module. The optical-electro transfer module is configured to perform optical-electro transfer on brightness information of an image using an optical-electro transfer function to obtain an electrical signal generated after optical-electro transfer. The space transfer module is configured to transfer the electrical signal generated after optical-electro transfer to YCBCR space to obtain image information generated after space transfer. The quantization module is configured to quantize, in the YCBCR space, the image information generated after space transfer to convert the image information generated after space transfer into 8/10-bit data using a quantization operation. The encoding module is configured to encode quantized image information to obtain encoded image information. Then, after obtaining, by performing optical-electro transfer on the brightness information of the image using $$L' = a\left(\frac{pL}{(p-1)L+1}\right)^m + b$$

in this application, an electrical signal generated after optical-electro transfer, the terminal device may transfer, using a preset space transfer function, the electrical signal generated after optical-electro transfer to the YCBCR space to obtain image information generated after space transfer, quantize, in the YCBCR space, the image information generated after space transfer, to obtain the quantized image information, and encode the quantized image information to obtain the encoded image information.

The YCBCR space is color space. The YCBCR space is used to compress brightness information for effective transmission of an image.

In a possible design, the terminal device may combine the method for processing an HDR image provided in this application with a conventional HDR video encoding framework that complies with an International Organization for Standardization (ISO) standard to improve resource utilization while improving quantization quality. The conventional HDR video encoding framework may include an optical-electro transfer module, a quantization module, a format conversion module, and an encoding module. The optical-electro transfer module is configured to perform optical-electro transfer on brightness information of an image using an optical-electro transfer function to obtain an electrical signal generated after optical-electro transfer. The quantization module is configured to quantize the electrical signal generated after optical-electro transfer to convert the electrical signal generated after optical-electro transfer into a 10-bit fixed point number using a quantization operation. The format conversion module is configured to convert a format of quantized image information from 4:4:4 into 4:2:0. The encoding module is configured to encode format-converted image information to obtain encoded image information. Then, after obtaining, by performing optical-electro transfer on the brightness information of the image using $$L' = a\left(\frac{pL}{(p-1)L+1}\right)^m + b$$

in this application, an electrical signal generated after optical-electro transfer, the terminal device may quantize the electrical signal generated after optical-electro transfer to obtain the quantized image information, perform format conversion on the quantized image information to obtain format-converted image information, and encode the format-converted image information to obtain the encoded image information.

According to a second aspect, a method for processing an HDR image is provided. The method includes obtaining, by a terminal device, encoded image information, decoding, by the terminal device, the encoded image information to obtain decoded image information, dequantizing, by the terminal device, the decoded image information to obtain dequantized image information, and performing, by the terminal device, the following processing on the dequantized image information to obtain processed image information:

$$L = \frac{1}{p\left(\frac{L'-b}{a}\right)^{-\frac{1}{m}} - p + 1},$$

where a, b, m, and p are rational numbers, L' is the dequantized image information, and L is the processed image information.

In this technical solution, the method for processing an HDR image in the second aspect is a reverse process of the method for processing an HDR image in the first aspect. It should be noted that a, b, m, and p are rational numbers. Optionally, a relationship between a and b may be a+b=1. For example, a=1.12672, b=−0.12672, m=0.14, and p=2.2. For another example, a=1.19996, b=−0.19996, m=0.11, and p=1.1. For another example, a=1.17053, b=−0.17053, m=0.12, and p=1.4. For another example, a=1.14698, b=−0.14698, m=0.13, and p=1.8. For another example, a=1.11007, b=−0.11007, m=0.15, and p=2.7. For another example, a=1.13014, b=−0.13014, m=0.14, and p=2.6. Further, the terminal device may perform the following processing on the dequantized image information to obtain the processed image information:

$$L = \frac{1}{p\left(\frac{L'-1+a}{a}\right)^{-\frac{1}{m}} - p + 1},$$

where a, b, m, and p are rational numbers, L' is the dequantized image information, and L is the processed image information.

Optionally, a relationship between a and b may also be a+b≠1. For example, a=1.11204, b=−0.122042, m=0.15, and p=3. For another example, a=1.09615, b=−0.1161462, m=0.16, and p=3.3. For another example, a=1.12762, b=−0.127622, m=0.14, and p=2.3. For another example, a=1.11204, b=−0.112042, m=0.15, and p=3. For another example, a=1.09615, b=−0.0961462, m=0.16, and p=3.3. It should be noted that a, b, m, and p are preset rational numbers, and may be an empirical value determined by a research and development person, or may be a value derived from a Weber score in an experiment process. This is not restricted in embodiments of the present disclosure.

In a possible design, the terminal device may combine the method for processing an HDR image provided in this application with a conventional HDR video decoding framework to improve resource utilization while improving quantization quality. The conventional HDR video decoding framework may include a decoding module, a dequantization module, a space transfer module, and an electro-optical transfer module. The decoding module is configured to decode encoded image information. The dequantization module is configured to dequantize decoded image information, to obtain [0,1] floating-point data. The space transfer module is configured to transfer dequantized image information from YCBCR space to RGB space or Lab space to obtain an electrical signal. The electro-optical transfer module is configured to perform electro-optical transfer on the electrical signal to obtain brightness information that is expressed in a 16-bit half-precision floating-point number or in a 32-bit floating-point number and that is generated after electro-optical transfer. Then, the terminal device may obtain the encoded image information, decode the encoded image information to obtain the decoded image information, dequantize the decoded image information to obtain the dequantized image information, transfer the dequantized image information from the YCBCR space to the RGB space or the Lab space using a preset space transfer function to obtain an electrical signal, and perform electro-optical transfer on the electrical signal using $$L = \frac{1}{p\left(\frac{L'-b}{a}\right)^{-\frac{1}{m}} - p + 1}$$

in this application to obtain brightness information.

In a possible design, the terminal device may combine the method for processing an HDR image provided in this application with a conventional HDR video decoding framework that complies with an ISO standard to improve resource utilization while improving quantization quality. The conventional HDR video decoding framework may include a decoding module, a format conversion module, a dequantization module, and an electro-optical transfer module. The decoding module is configured to decode encoded image information. The format conversion module is configured to convert a format of decoded image information from 4:2:0 into 4:4:4. The dequantization module is configured to dequantize format-converted image information to obtain an electrical signal. The electro-optical transfer module is configured to perform electro-optical transfer on the electrical signal to obtain brightness information generated after electro-optical transfer. Then, the terminal device may obtain the encoded image information, decode the encoded image information to obtain the decoded image information, perform format conversion on the decoded image information to obtain format-converted image information, dequantize the format-converted image information to obtain an electrical signal, and perform electro-optical transfer on the electrical signal using $$L = \cfrac{1}{p\left(\cfrac{L'-b}{a}\right)^{-\frac{1}{m}} - p + 1}$$

in this application to obtain brightness information.

According to a third aspect, a computer storage medium is provided. The computer storage medium may store a program. When the program is executed, some or all of the steps in the first aspect are included.

According to a fourth aspect, a computer storage medium is provided. The computer storage medium may store a program. When the program is executed, some or all of the steps in the second aspect are included.

According to a fifth aspect, an apparatus for processing an HDR image is provided. Modules included in the apparatus may be configured to perform some or all of the steps with reference to the first aspect.

According to a sixth aspect, an apparatus for processing an HDR image is provided. Modules included in the apparatus may be configured to perform some or all of the steps with reference to the second aspect.

According to a seventh aspect, a terminal device is provided. The terminal device includes a processor and a memory. The memory is configured to store an instruction. The processor is configured to execute the instruction. When executing the instruction, the processor may be configured to perform some or all of the steps with reference to the first aspect.

According to an eighth aspect, a terminal device is provided. The terminal device includes a processor and a memory. The memory is configured to store an instruction. The processor is configured to execute the instruction. When executing the instruction, the processor may be configured to perform some or all of the steps with reference to the second aspect.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure.

Figure 2:
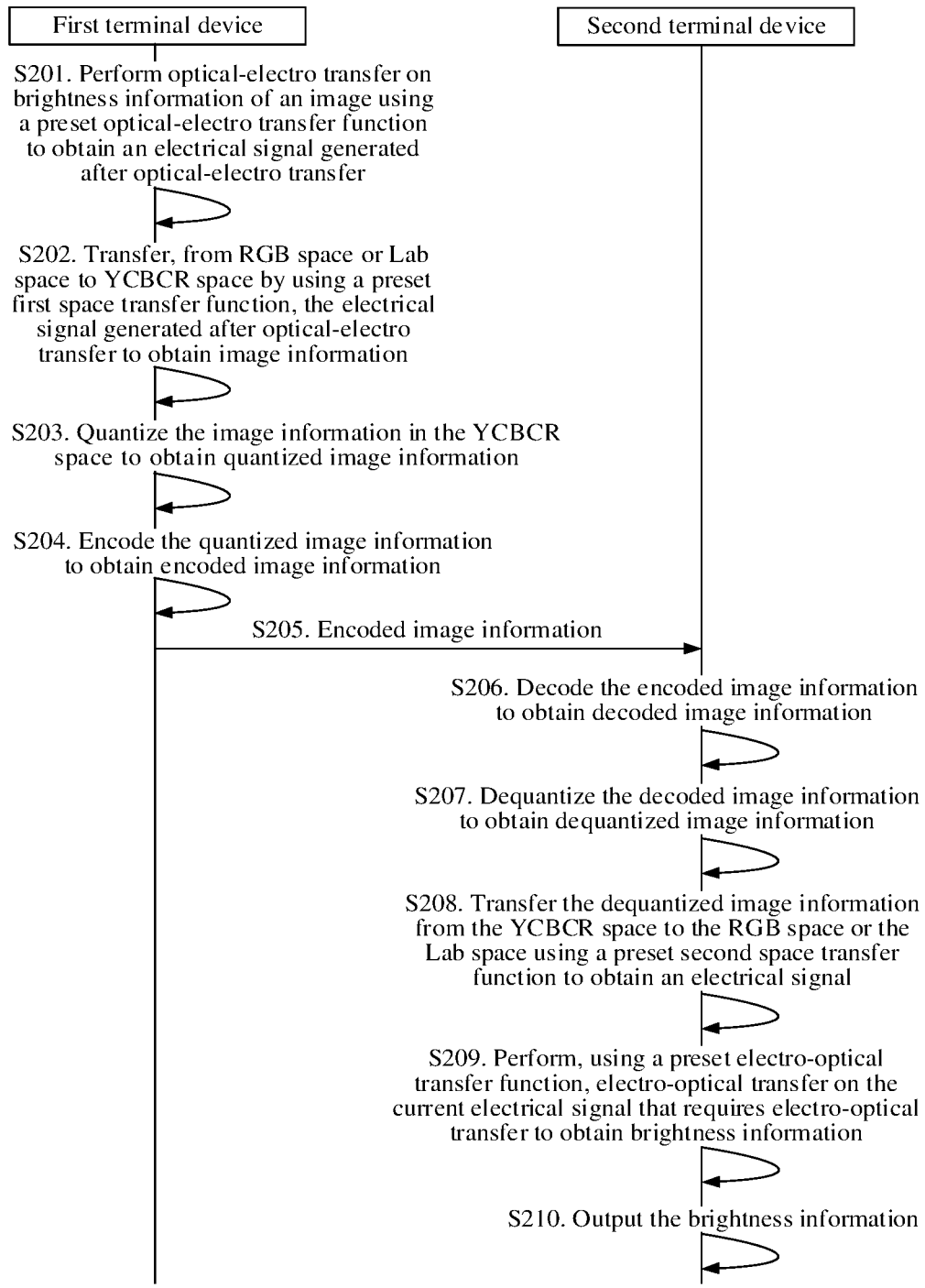
FIG. 2 is a schematic flowchart of a method for processing an HDR image according to an embodiment of the present disclosure.

Referring to FIG. 2, FIG. 2 is a schematic flowchart of a method for processing an HDR image according to an embodiment of the present disclosure. As shown in the figure, the method for processing an HDR image in this embodiment of the present disclosure may include at least the following steps.

Step S201. A first terminal device performs optical-electro transfer on brightness information of an image using a preset optical-electro transfer function to obtain an electrical signal generated after optical-electro transfer.

The first terminal device may perform optical-electro transfer on the brightness information of the image using the preset optical-electro transfer function to obtain the electrical signal generated after optical-electro transfer. The first terminal device may be a satellite, a personal computer (PC), a smartphone, or the like.

In specific implementation, a quantization curve simulates a change in perceptive details of a human eye for different brightness. Based on statistics on a test sequence, it is learned that there is a relatively large difference between a brightness distribution curve of a real world and a curve that simulates how the human eye perceives brightness. For example, dynamic-range statistics are collected on an existing CT2020 HDR high-definition sequence. Six brightness ranges are obtained through division to collect the statistics, and a statistical result is shown in Table 1.

TABLE 1

| | Brightness range (nits) | | | | |
|---|---|---|---|---|---|
| | 0-1000 | 1000-2000 | 2000-3000 | 3000-4000 | >4000 |
| Sequence A | 99.849% | 0.101% | 0.038% | 0.012% | 0.000% |
| Sequence B | 99.938% | 0.035% | 0.015% | 0.012% | 0.000% |
| Sequence C | 80.851% | 14.566% | 3.329% | 1.254% | 0.000% |
| Sequence D | 92.156% | 7.227% | 0.388% | 0.192% | 0.038% |

It can be learned from Table 1 that although the HDR sequence has a relatively HDR, main brightness is distributed between 0 nits and 2000 nits (excluding 2000 nits). Brightness distributed between 0 nits and 1000 nits accounts for 80% to 99%, and brightness distributed between 0 nits and 2000 nits (excluding 2000 nits) accounts for 97% to 99%. Therefore, considering a sensitivity characteristic of the human eye for brightness, from a vision characteristic of the human eye, a range with brightness between 0 nits and 10000 nits is used as a key protected brightness segment of the quantization curve.

A conventional rational quantization function is:

$$F(L) = \frac{pL}{(p-1)L+1},$$

where p is a preset parameter, L is brightness information of a real world, and F(L) is a quantized value. A quantization curve of a rational quantization function shown in FIG. 1B is used as an example. The curve is in a relatively simple form, has a relatively good adaptation characteristic, and can meet a brightness perception characteristic of the human eye. However, Weber scores of a rational quantization curve have a relatively poor effect. A dynamic range that is less than a Schreiber threshold is quite narrow, and the Weber scores of the rational quantization curve cannot be completely distributed under the Schreiber threshold.

In addition, a Gamma function is defined in the ITU Radiocommunication Sector (ITU-R) Recommendation BT.1886 standard. The Gamma function is an early optical-electro transfer function. The Gamma function is shown as follows:

$$L = a(\max[(V+b), 0])^r,$$

where L represents an electrical signal generated after optical-electro transfer, $a = (L_W^{1/r} - L_B^{1/r})^r$, V represents brightness information of a real world, $$b = \frac{L_B^{\frac{1}{r}}}{L_W^{\frac{1}{r}} - L_B^{\frac{1}{r}}},$$

and r=2.4.

An image that is displayed on a display device with brightness of 100 nits using the Gamma function has relatively good quality. However, with an upgrade of the display device, when the brightness of the display device is 600 nits or 2000 nits, an image that is output using the Gamma function cannot be normally displayed on the display device.

Therefore, with reference to the rational quantization function and the Gamma function, an optical-electro transfer function in this application is proposed in this embodiment of the present disclosure. A Weber score obtained through calculation using the optical-electro transfer function accords with a distribution characteristic of scenario brightness statistics, making the quantization curve better accord with a characteristic of human eye perception, that is, effectively expanding a dynamic range that meets a Weber score constraint.

Figure 1A:
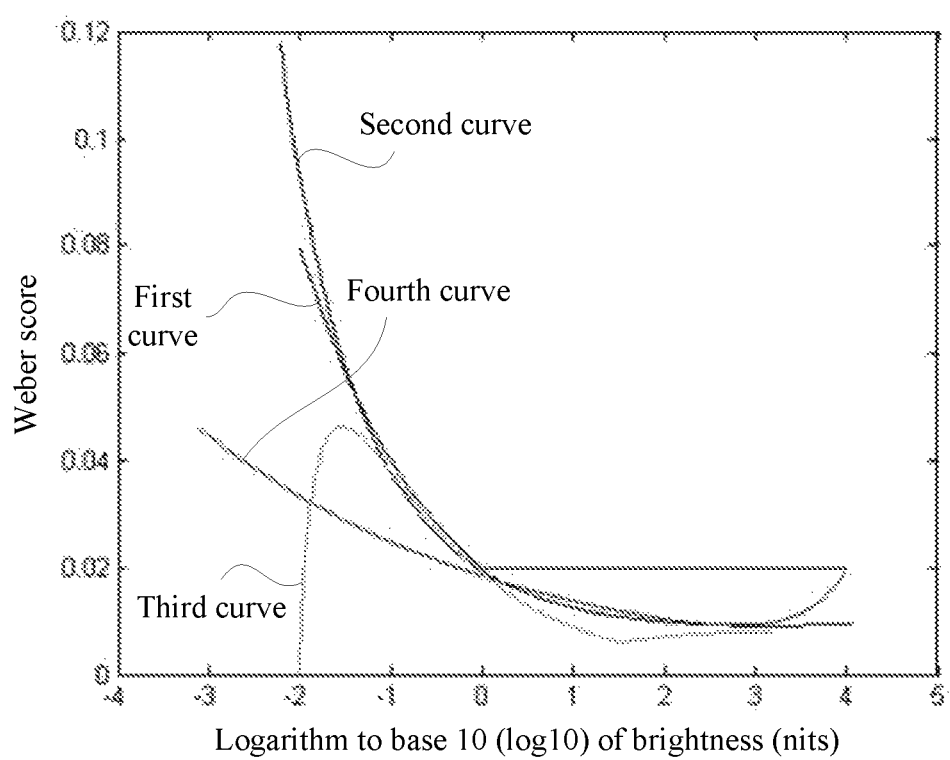
FIG. 1A is a schematic diagram of a screen of a Weber score according to an embodiment of the present disclosure.
Figure 1B:
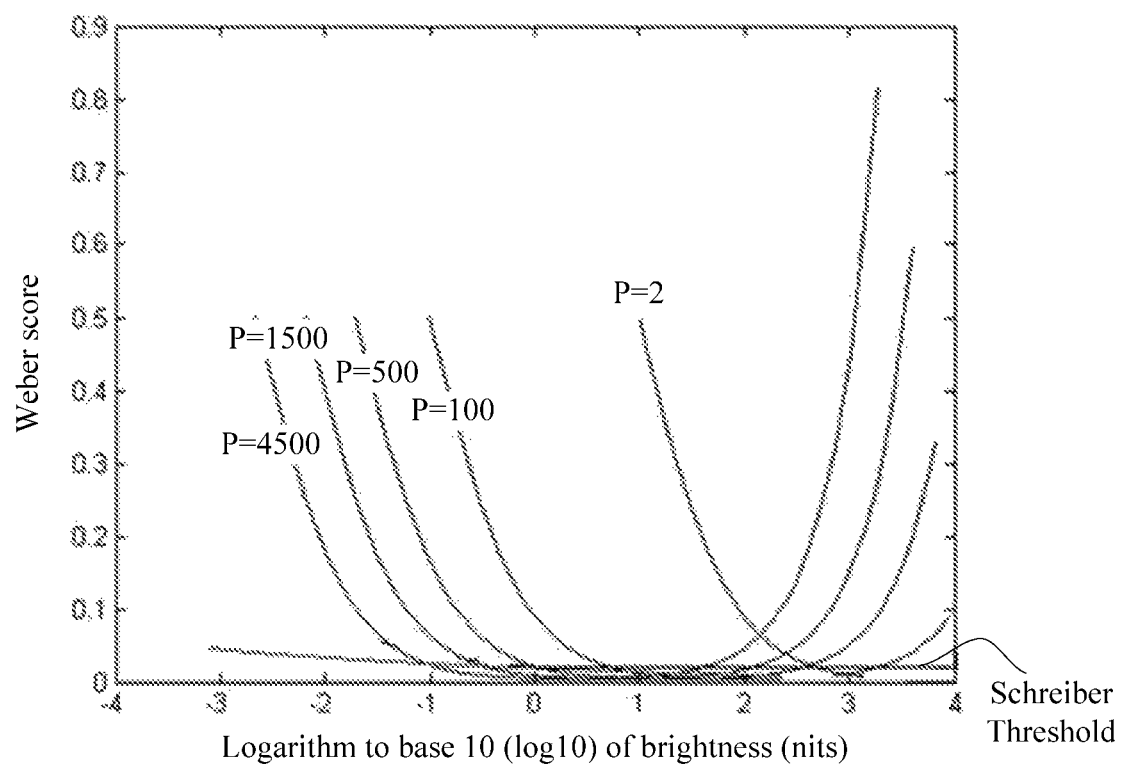
FIG. 1B is a schematic diagram of a screen of a quantization curve of a rational quantization function according to an embodiment of the present disclosure.
Figure 1C:
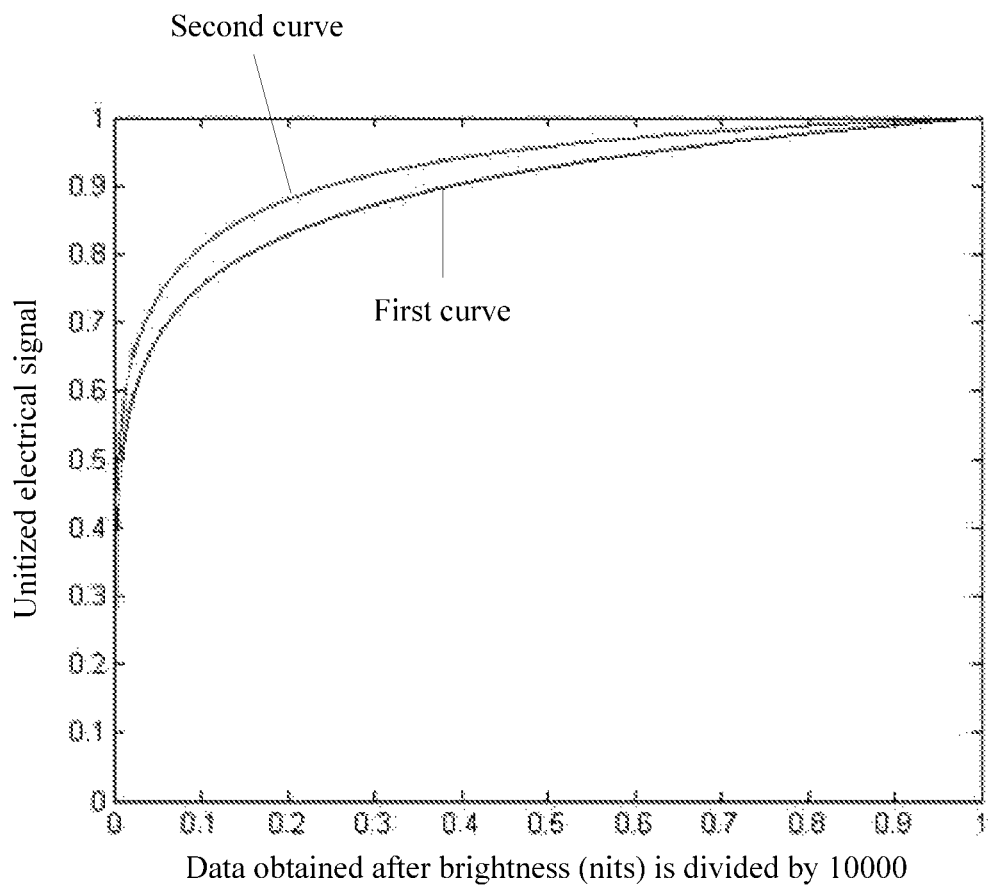
FIG. 1C is a schematic diagram of a screen of a brightness statistics curve according to an embodiment of the present disclosure.

A brightness statistics curve shown in FIG. 1C is used as an example. A first curve is a brightness statistics curve obtained based on scheme 1. A second curve is a brightness statistics curve obtained based on this application. The second curve rises faster than the first curve in a range of 0 nits to 1000 nits. This indicates that the second curve has a better stripe noise suppression capability in a low-brightness part.

An optical-electro transfer function in conventional scheme 2 uses the conventional Gamma function at a low end and a log curve at a high end. A Hybrid Log-Gamma transfer function is proposed. The Hybrid Log-Gamma function may be shown as follows:

$$E' = \begin{cases} r\sqrt{E} & 0 \leq E \leq 1 \\ a\ln(E-b) + c & 1 < E \end{cases},$$

where E' represents an electrical signal generated after optical-electro transfer, E represents brightness information of a real world, and a, b, c, and r are preset parameters. A dynamic range in scheme 2 is only between 0 nits and 2000 nits (excluding 2000 nits). A part exceeding 2000 nits is truncated to 2000 nits.

A Weber score shown in FIG. 1A is used as an example. A first curve is a Schreiber threshold in an ITU Report BT.2246 standard file. A second curve includes Weber scores obtained using an optical-electro transfer function in scheme 1. A third curve includes Weber scores obtained using the optical-electro transfer function in scheme 2. A fourth curve includes Weber scores obtained using the optical-electro transfer function in this application. When a brightness value is less than 0.1 nits, the second curve does not meet the Schreiber threshold. A curve quantization range of the third curve is relatively narrow and is between 0.01 nits and 2000 nits. A quantization range of the fourth curve may reach 10000 nits, and therefore, the fourth curve better accords with a characteristic of human eye perception.

Step S202. The first terminal device transfers, from RGB space or Lab space to YCBCR space using a preset first space transfer function, the electrical signal generated after optical-electro transfer to obtain image information.

Step S203. The first terminal device quantizes the image information in the YCBCR space to obtain quantized image information.

Step S204. The first terminal device encodes the quantized image information to obtain encoded image information.

Step S205. The first terminal device sends the encoded image information to a second terminal device.

Step S206. The second terminal device decodes the encoded image information to obtain decoded image information.

After receiving the encoded image information sent by the first terminal device, the second terminal device may decode the encoded image information to obtain the decoded image information. The second terminal device may be a digital television receiving terminal, a PC, a smartphone, or the like.

Step S207. The second terminal device dequantizes the decoded image information to obtain dequantized image information.

Step S208. The second terminal device transfers the dequantized image information from the YCBCR space to the RGB space or the Lab space using a preset second space transfer function to obtain an electrical signal.

Step S209. The second terminal device performs, using a preset electro-optical transfer function, electro-optical transfer on the current electrical signal that requires electro-optical transfer to obtain brightness information.

Step S210. The second terminal device outputs the brightness information.

When a video encoding and decoding framework is SMPTE 2084 TF, an original optical-electro transfer module is updated to the optical-electro transfer function in this application. It can be learned through analysis that compared with an original video encoding and decoding method, the method for processing an HDR image in this application saves a bit rate by 18.8% for a peak signal to noise ratio (PSNR), saves a bit rate by 20.3% for a masked PSNR (MPSNR), and saves a bit rate by 9% for Delta-E (ΔE), which is a test unit of a color difference perceived by the human eye.

In the method for processing an HDR image shown in FIG. 2, the first terminal device performs optical-electro transfer on the brightness information of the image using the preset optical-electro transfer function to obtain the electrical signal generated after optical-electro transfer, transfers, from the RGB space or the Lab space to the YCBCR space using the preset first space transfer function, the electrical signal generated after optical-electro transfer to obtain the image information, quantizes the image information in the YCBCR space to obtain the quantized image information, encodes the quantized image information, and sends the encoded image information to the second terminal device. The second terminal device decodes the encoded image information to obtain the decoded image information, dequantizes the decoded image information to obtain the dequantized image information, transfers the dequantized image information from the YCBCR space to the RGB space or the Lab space using the preset second space transfer function to obtain the electrical signal, performs, using the preset electro-optical transfer function, electro-optical transfer on the current electrical signal that requires electro-optical transfer to obtain the brightness information, and outputs the brightness information. In this way, quantization quality is improved, and resource utilization is also improved.

Figure 3:
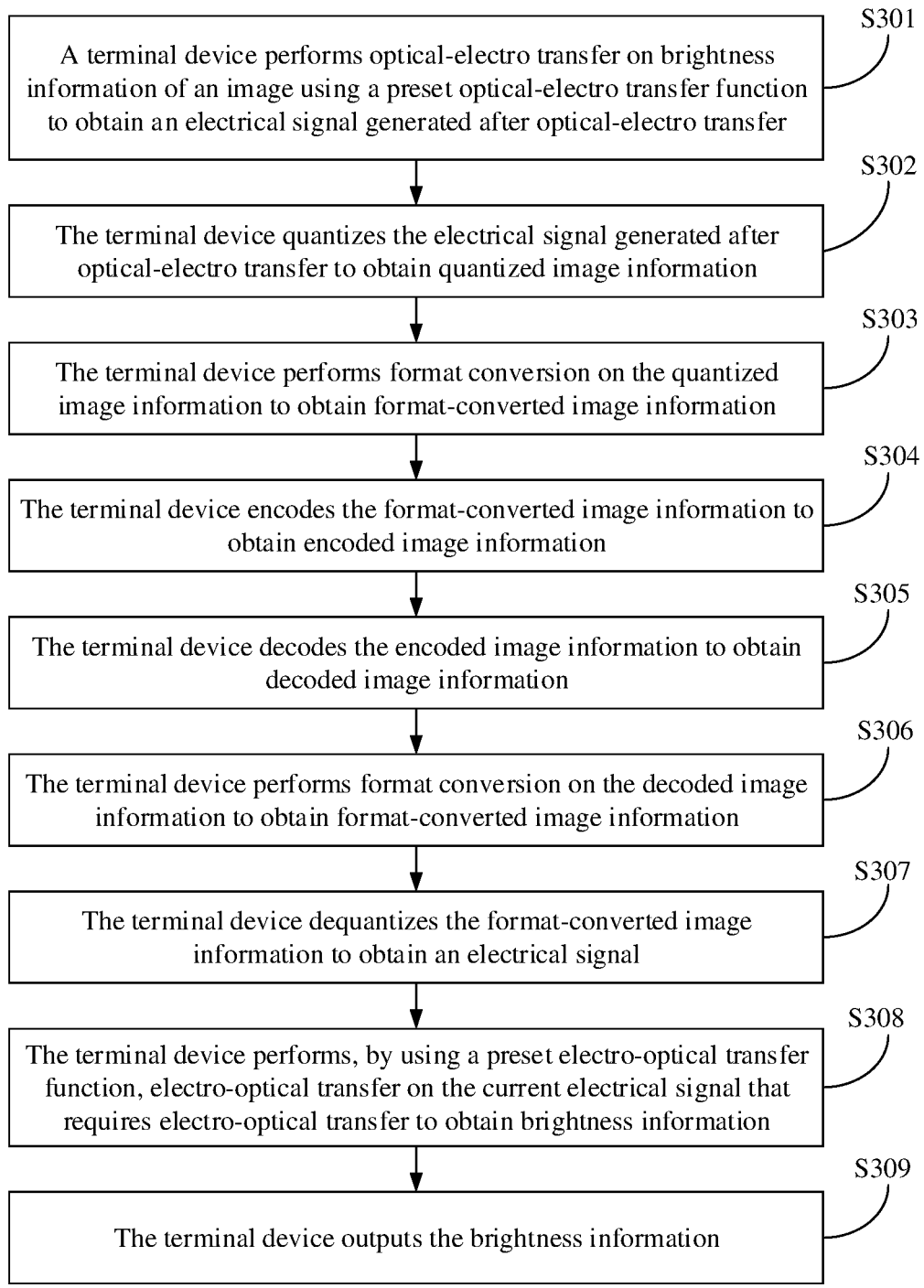
FIG. 3 is a schematic flowchart of a method for processing an HDR image according to another embodiment of the present disclosure.

Referring to FIG. 3, FIG. 3 is a schematic flowchart of a method for processing an HDR image according to another embodiment of the present disclosure. As shown in FIG. 3, the method for processing an HDR image in this embodiment of the present disclosure may include at least the following steps.

Step S301. A terminal device performs optical-electro transfer on brightness information of an image using a preset optical-electro transfer function to obtain an electrical signal generated after optical-electro transfer.

The terminal device may perform optical-electro transfer on the brightness information of the image using the preset optical-electro transfer function to obtain the electrical signal generated after optical-electro transfer. The terminal device may be a smartphone, a camera, a tablet computer, or the like. The image may be collected by the camera or stored locally in advance.

Step S302. The terminal device quantizes the electrical signal generated after optical-electro transfer to obtain quantized image information.

Step S303. The terminal device performs format conversion on the quantized image information to obtain format-converted image information.

Step S304. The terminal device encodes the format-converted image information to obtain encoded image information.

Step S305. The terminal device decodes the encoded image information to obtain decoded image information.

Step S306. The terminal device performs format conversion on the decoded image information to obtain format-converted image information.

Step S307. The terminal device dequantizes the format-converted image information to obtain an electrical signal.

Step S308. The terminal device performs, using a preset electro-optical transfer function, electro-optical transfer on the current electrical signal that requires electro-optical transfer to obtain brightness information.

Step S309. The terminal device outputs the brightness information.

In the method for processing an HDR image shown in FIG. 3, the terminal device performs optical-electro transfer on the brightness information of the image using the preset optical-electro transfer function to obtain the electrical signal generated after optical-electro transfer, quantizes the electrical signal generated after optical-electro transfer to obtain the quantized image information, performs format conversion on the quantized image information to obtain the format-converted image information, encodes the format-converted image information, decodes the encoded image information to obtain the decoded image information, performs format conversion on the decoded image information to obtain the format-converted image information, dequantizes the format-converted image information to obtain the electrical signal, performs, using the preset electro-optical transfer function, electro-optical transfer on the current electrical signal that requires electro-optical transfer to obtain the brightness information, and further outputs the brightness information. In this way, quantization quality is improved, and resource utilization is also improved.

Figure 4:
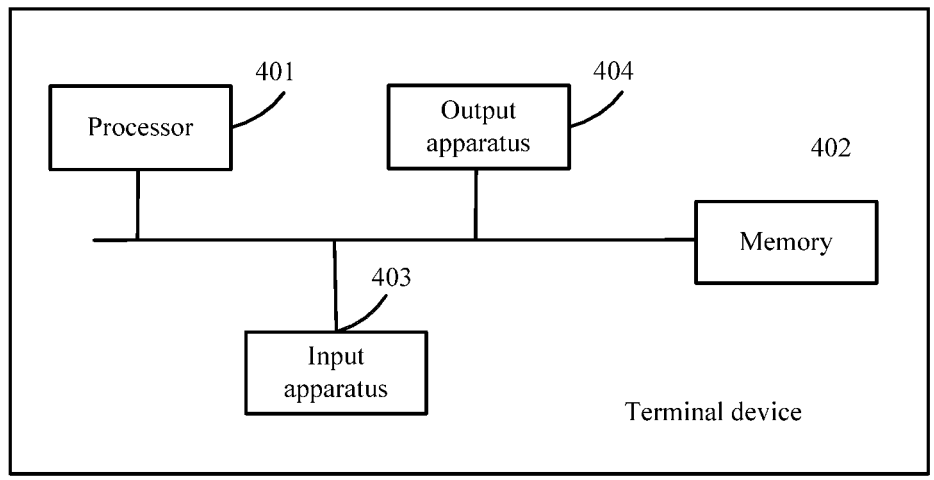
FIG. 4 is a schematic structural diagram of a terminal device according to an embodiment of the present disclosure.

Referring to FIG. 4, FIG. 4 is a schematic structural diagram of a terminal device according to an embodiment of the present disclosure. As shown in FIG. 4, the terminal device may include a processor 401, a memory 402, an input apparatus 403, and an output apparatus 404. The processor 401 is connected to the memory 402, the input apparatus 403, and the output apparatus 404. For example, the processor 401 may be connected to the memory 402, the input apparatus 403, and the output apparatus 404 using a bus.

The processor 401 may be a central processing unit (CPU), a network processor (NP), or the like.

The memory 402 may be configured to store brightness information of an image and the like. The memory 402 may include a volatile memory, for example, a random access memory (RAM), the memory may include a nonvolatile memory, for example, a read-only memory (ROM), a flash memory, a hard disk drive (HDD), or a solid-state drive (SSD), or the memory may include a combination of the memories of the foregoing types.

The output apparatus 404 is configured to output brightness information. For example, the output apparatus 404 is a wireless interface or a wired interface.

The processor 401 invokes a program stored in the memory 402, and may perform the following operations. The processor 401 is configured to obtain the brightness information of the image, perform the following processing on the brightness information, to obtain processed image information:

$$L' = a\left(\frac{pL}{(p-1)L+1}\right)^m + b,$$

where a, b, m, and p are rational numbers, L is the brightness information of the image, and L' is the processed image information, the processor 401 is further configured to quantize the processed image information to obtain quantized image information, and the processor 401 is further configured to encode the quantized image information to obtain encoded image information.

Further, the terminal device described in this embodiment of the present disclosure may be configured to implement some or all of the processes in the embodiment that is of the method for processing an HDR image and that is described with reference to FIG. 2 or FIG. 3 in the embodiment of the present disclosure.

Referring to FIG. 4, FIG. 4 is a schematic structural diagram of a terminal device according to an embodiment of the present disclosure. As shown in FIG. 4, the terminal device may include a processor 401, a memory 402, an input apparatus 403, and an output apparatus 404. The processor 401 is connected to the memory 402, the input apparatus 403, and the output apparatus 404. For example, the processor 401 may be connected to the memory 402, the input apparatus 403, and the output apparatus 404 using a bus.

The processor 401 may be a CPU, an NP, or the like.

The memory 402 may be configured to store brightness information of an image and the like. The memory 402 may include a volatile memory, for example, a RAM, the memory may include a nonvolatile memory, for example, a ROM, a flash memory, an HDD, or an SSD, or the memory may include a combination of the memories of the foregoing types.

The input apparatus 403 is configured to obtain encoded image information. For example, the input apparatus 403 is a wireless interface or a wired interface.

The output apparatus 404 is configured to output brightness information. For example, the output apparatus 404 is a display screen.

The processor 401 invokes a program stored in the memory 402, and may perform the following operations. The processor 401 is configured to obtain the encoded image information, decode the encoded image information to obtain decoded image information, the processor 401 is further configured to dequantize the decoded image information to obtain dequantized image information, and the processor 401 is further configured to perform the following processing on the dequantized image information to obtain processed image information:

$$L = \frac{1}{p\left(\frac{L'-b}{a}\right)^{-\frac{1}{m}} - p + 1},$$

where a, b, m, and p are rational numbers, L' is the dequantized image information, and L is the processed image information.

Further, the terminal device described in this embodiment of the present disclosure may be configured to implement some or all of the processes in the embodiment that is of the method for processing an HDR image and that is described with reference to FIG. 2 or FIG. 3 in the embodiment of the present disclosure.

Figure 5:
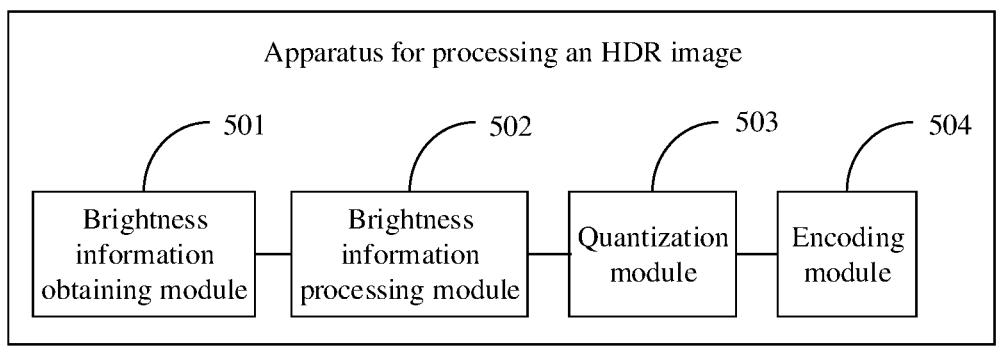
FIG. 5 is a schematic structural diagram of an apparatus for processing an HDR image according to an embodiment of the present disclosure.

Referring to FIG. 5, FIG. 5 is a schematic structural diagram of an apparatus for processing an HDR image according to an embodiment of the present disclosure. The apparatus for processing an HDR image in this embodiment of the present disclosure may be configured to implement some or all of the processes in the embodiment that is of the method for processing an HDR image and that is described with reference to FIG. 2 or FIG. 3 in the embodiment of the present disclosure. As shown in the figure, the apparatus for processing an HDR image in this embodiment of the present disclosure may include at least a brightness information obtaining module 501, a brightness information processing module 502, a quantization module 503, and an encoding module 504.

The brightness information obtaining module 501 is configured to obtain brightness information of an image.

The brightness information processing module 502 is configured to perform the following processing on the brightness information to obtain processed image information:

$$L' = a\left(\frac{pL}{(p-1)L+1}\right)^m + b,$$

where a, b, m, and p are rational numbers, L is the brightness information of the image, and L' is the processed image information.

The quantization module 503 is configured to quantize the processed image information to obtain quantized image information.

The encoding module 504 is configured to encode the quantized image information to obtain encoded image information.

In the apparatus for processing an HDR image shown in FIG. 5, the brightness information obtaining module 501 obtains the brightness information of the image, the brightness information processing module 502 processes the brightness information, to obtain the processed image information, the quantization module 503 quantizes the processed image information, to obtain the quantized image information, and the encoding module 504 encodes the quantized image information to obtain the encoded image information. In this way, quantization quality is improved.

Figure 6:
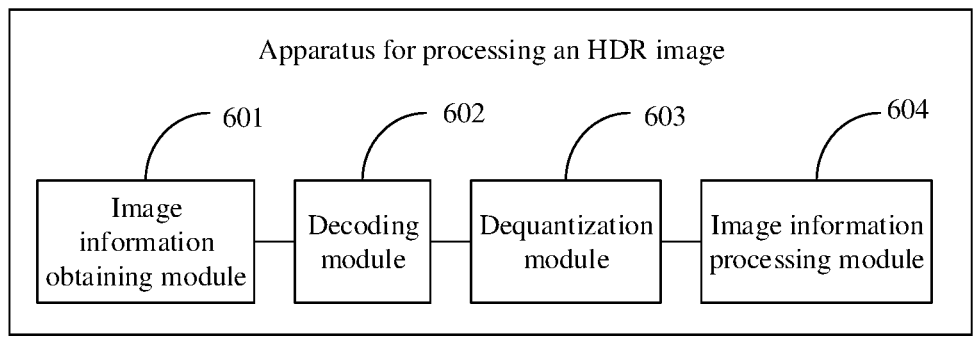
FIG. 6 is a schematic structural diagram of an apparatus for processing an HDR image according to another embodiment of the present disclosure.

Referring to FIG. 6, FIG. 6 is a schematic structural diagram of an apparatus for processing an HDR image according to another embodiment of the present disclosure. The apparatus for processing an HDR image in this embodiment of the present disclosure may be configured to implement some or all of the processes in the embodiment that is of the method for processing an HDR image and that is described with reference to FIG. 2 or FIG. 3 in the embodiment of the present disclosure. As shown in the figure, the apparatus for processing an HDR image in this embodiment of the present disclosure may include at least an image information obtaining module 601, a decoding module 602, a dequantization module 603, and an image information processing module 604.

The image information obtaining module 601 is configured to obtain encoded image information.

The decoding module 602 is configured to decode the encoded image information to obtain decoded image information.

The dequantization module 603 is configured to dequantize the decoded image information, to obtain dequantized image information.

The image information processing module 604 is configured to perform the following processing on the dequantized image information to obtain processed image information:

$$L = \frac{1}{p\left(\frac{L'-b}{a}\right)^{-\frac{1}{m}} - p + 1},$$

where a, b, m, and p are rational numbers, L' is the dequantized image information, and L is the processed image information.

In the apparatus for processing an HDR image shown in FIG. 6, the image information obtaining module 601 obtains the encoded image information, the decoding module 602 decodes the encoded image information to obtain the decoded image information, the dequantization module 603 dequantizes the decoded image information to obtain the dequantized image information, and the image information processing module 604 processes the dequantized image information to obtain the processed image information. In this way, quantization quality is improved.

In this embodiment of the present disclosure, for $$L' = a\left(\frac{pL}{(p-1)L+1}\right)^m + b,$$

a, b, m, and p are rational numbers. For example, a=1.2441, b=−0.2441, m=0.1, and p=1.1. For another example, a=1.20228, b=−0.20228, m=0.11, and p=1.2. For another example, a=1.17529, b=−0.17529, m=0.12, and p=1.7. For another example, a=1.14933, b=−0.14933, m=0.13, and p=2. For another example, a=1.12762, b=−0.12762, m=0.14, and p=2.3. For another example, a=1.11204, b=−0.11204, m=0.15, and p=3. For another example, a=1.09615, b=−0.09615, m=0.16, and p=3.3.

For $$L = \frac{1}{p\left(\frac{L'-b}{a}\right)^{-\frac{1}{m}} - p + 1},$$

a, b, m, and p are rational numbers. For example, a=1.2441, b=−0.2441, m=0.1, and p=1.1. For another example, a=1.20228, b=−0.20228, m=0.11, and p=1.2. For another example, a=1.17529, b=−0.17529, m=0.12, and p=1.7. For another example, a=1.14933, b=−0.14933, m=0.13, and p=2. For another example, a=1.12762, b=−0.12762, m=0.14, and p=2.3. For another example, a=1.11204, b=−0.11204, m=0.15, and p=3. For another example, a=1.09615, b=−0.09615, m=0.16, and p=3.3.

In descriptions in this specification, descriptions about such reference terms as "an embodiment," "some embodiments," "an example," "a specific example," and "some examples" mean that specific features, structures, materials, or characteristics described with reference to the embodiments or examples are included in at least one embodiment or example of the present disclosure. In this specification, the foregoing example expressions of the terms are not necessarily with respect to a same embodiment or example. In addition, the described specific features, structures, materials, or characteristics may be combined in a proper manner in any one or more of the embodiments or examples. In addition, a person skilled in the art may integrate or combine different embodiments or examples and characteristics of different embodiments or examples described in this specification, as long as they do not conflict each other.

In addition, the terms "first" and "second" are merely intended for a purpose of description, and shall not be understood as an indication or implication of relative importance or an implicit indication of a quantity of indicated technical features. Therefore, a feature limited by "first" or "second" may explicitly or implicitly includes at least one of the features. In the descriptions about the embodiment of the present disclosure, "a plurality of" means at least two, for example, two or three, unless otherwise limited.

Logic and/or steps shown in the flowcharts or described herein in other manners, for example, may be considered as a program list of executable instructions that are used to implement logical functions, and may be further implemented on any computer-readable medium, for an instruction execution system, apparatus, or device (for example, a computer-based system, a system including a processor, or another system that can fetch instructions from the instruction execution system, apparatus, or device and execute the instructions) to use, or for a combination of the instruction execution system, apparatus, or device to use. In terms of this specification, the "computer-readable medium" may be any apparatus that may include, store, communicate, propagate, or transmit programs, for the instruction execution system, apparatus, or device to use, or for a combination of the instruction execution system, apparatus, or device to use. More specific examples (this list is not exhaustive) of the computer-readable medium include the following. An electrical connection part (an electronic apparatus) with one or more buses, a portable computer cartridge (a magnetic apparatus), a RAM, a ROM, an erasable programmable ROM, an optical fiber apparatus, and a portable compact disc ROM (CD ROM). In addition, the computer-readable medium may even be a piece of paper on which the programs can be printed or another appropriate medium. Because, for example, optical scanning may be performed on the paper or the other medium, then processing, such as edition, decoding, or another appropriate means when necessary, may be performed to obtain the programs in an electronic manner, and then the programs are stored in a computer memory.

It should be understood that parts in the embodiment of the present disclosure may be implemented using hardware, software, firmware, or a combination thereof. In the foregoing implementations, a plurality of steps or methods may be implemented using software or firmware that is stored in a memory and is executed by an appropriate instruction execution system. For example, if hardware is used for implementation, being similar to implementation in another implementation, any item or a combination of the following well-known technologies in the art may be used for implementation of a discrete logic circuit having a logic gate circuit that is configured to implement a logical function for a data signal, an application-specific integrated circuit having an appropriate combinatorial logic gate circuit, a programmable gate array, a field programmable gate array, and the like.

In addition, the modules in the embodiments of the present disclosure may be implemented in a form of hardware, or may be implemented in a form of a software functional module. If an integrated module is implemented in the form of a software functional module and sold or used as an independent product, the integrated module may be stored in a computer-readable storage medium.

What is claimed is:

1. A method for processing a high dynamic range (HDR) image by a terminal device, the method comprising:
    obtaining, by the terminal device, an image (L);
    obtaining, by the terminal device, brightness information of the L;
    processing, by the terminal device, the L to obtain processed image information (L') using the following equation:

$$L' = a\left(\frac{pL}{(p-1)L+1}\right)^m + b,$$

wherein the a, the b, the m, and the p comprise rational numbers;
    quantizing, by the terminal device, the L' to obtain quantized image information; and
    encoding, by the terminal device, the quantized image information to obtain encoded image information.

2. The method of claim 1, wherein the a, the b, the m, and the p comprise:
a=1.12672, b=−0.12672, m=0.14, and p=2.2;
a=1.19996, b=−0.19996, m=0.11, and p=1.1;
a=1.17053, b=−0.17053, m=0.12, and p=1.4;
a=1.14698, b=−0.14698, m=0.13, and p=1.8;
a=1.11007, b=−0.11007, m=0.15, and p=2.7;
a=1.12762, b=−0.127622, m=0.14, and r=2.3;
a=1.13014, b=−0.13014, m=0.14, and p=2.6;
a=1.11204, b=−0.112042, m=0.15, and p=3; or
a=1.09615, b=−0.0961462, m=0.16, and p=3.3.

3. The method of claim 1, wherein the a, the b, the m, and the p comprise:
a=1.2441, b=−0.2441, m=0.1, and p=1.1;
a=1.20228, b=−0.20228, m=0.11, and p=1.2;
a=1.17529, b=−0.17529, m=0.12, and p=1.7;
a=1.14933, b=−0.14933, m=0.13, and p=2;
a=1.12762, b=−0.12762, m=0.14, and p=2.3;
a=1.11204, b=−0.11204, m=0.15, and p=3; or
a=1.09615, b=−0.09615, m=0.16, and p=3.3.

4. The method of claim 1, wherein the terminal device comprises a satellite, a personal computer, or a smartphone.

5. The method of claim 1, further comprising storing, by the terminal device, the encoded image information to a non-transitory memory.

6. A method for processing a high dynamic range (HDR) image by a terminal device, the method comprising:
obtaining, by the terminal device, encoded image information;
decoding, by the terminal device, the encoded image information to obtain decoded image information;
dequantizing, by the terminal device, the decoded image information to obtain dequantized image information (L');
processing, by the terminal device, the L' to obtain processed image information (L) using the following equation of:

$$L = \frac{1}{p\left(\frac{L'-b}{a}\right)^{-\frac{1}{m}} - p + 1},$$

wherein the a, the b, the m, and the p comprise rational numbers; and
displaying, by the terminal device, an image according to the L.

7. The method of claim 6, wherein the a, the b, the m, and the p comprise:
a=1.12672, b=−0.12672, m=0.14, and p=2.2;
a=1.19996, b=−0.19996, m=0.11, and p=1.1;
a=1.17053, b=−0.17053, m=0.12, and p=1.4;
a=1.14698, b=−0.14698, m=0.13, and p=1.8;
a=1.11007, b=−0.11007, m=0.15, and p=2.7;
a=1.12762, b=−0.127622, m=0.14, and p=2.3;
a=1.13014, b=−0.13014, m=0.14, and p=2.6;
a=1.11204, b=−0.112042, m=0.15, and p=3; or
a=1.09615, b=−0.0961462, m=0.16, and p=3.3.

8. The method of claim 6, wherein the a, the b, the m, and the p comprise:
a=1.2441, b=−0.2441, m=0.1, and p=1.1;
a=1.20228, b=−0.20228, m=0.11, and p=1.2;
a=1.17529, b=−0.17529, m=0.12, and p=1.7;
a=1.14933, b=−0.14933, m=0.13, and p=2;
a=1.12762, b=−0.12762, m=0.14, and p=2.3;
a=1.11204, b=−0.11204, m=0.15, and p=3; or
a=1.09615, b=−0.09615, m=0.16, and p=3.3.

9. A terminal device for processing a high dynamic range (HDR) image, comprising:
a non-transitory memory comprising instructions; and
a hardware processor coupled to the non-transitory memory, wherein the instructions cause the hardware processor to be configured to:
obtain encoded image information;
decode the encoded image information to obtain decoded image information;
dequantize the decoded image information to obtain dequantized image information (L');
process the L' to obtain processed image information (L) using the following equation of:

$$L = \frac{1}{p\left(\frac{L'-b}{a}\right)^{-\frac{1}{m}} - p + 1},$$

wherein the a, the b, the m, and the p comprise rational numbers; and
display an image according to the L.

10. The terminal device of claim 9, wherein the a, the b, the m, and the p comprise:
a=1.12672, b=−0.12672, m=0.14, and p=2.2;
a=1.19996, b=−0.19996, m=0.11, and p=1.1;
a=1.17053, b=−0.17053, m=0.12, and p=1.4;
a=1.14698, b=−0.14698, m=0.13, and p=1.8;
a=1.11007, b=−0.11007, m=0.15, and p=2.7;
a=1.12762, b=−0.127622, m=0.14, and p=2.3;
a=1.13014, b=−0.13014, m=0.14, and p=2.6;
a=1.11204, b=−0.112042, m=0.15, and p=3; or
a=1.09615, b=−0.0961462, m=0.16, and p=3.3.

11. The terminal device of claim 9, wherein the a, the b, the m, and the p comprise:
a=1.2441, b=−0.2441, m=0.1, and p=1.1;
a=1.20228, b=−0.20228, m=0.11, and p=1.2;
a=1.17529, b=−0.17529, m=0.12, and p=1.7;
a=1.14933, b=−0.14933, m=0.13, and p=2;
a=1.12762, b=−0.12762, m=0.14, and p=2.3;
a=1.11204, b=−0.11204, m=0.15, and p=3; or
a=1.09615, b=−0.09615, m=0.16, and p=3.3.

12. A method for processing a high dynamic range (HDR) image by a terminal device, the method comprising:
obtaining, by the terminal device, an image (L);
obtaining, by the terminal device, obtaining brightness information of the L, wherein the L comprises a value recording an optical signal, and wherein the L is proportional to light intensity; and
performing, by the terminal device, conversion processing on the L to obtain processed image information (L'), wherein the L' comprises a numeric expression value of an image signal, and wherein the conversion processing comprises the following equation of:

$$L' = a\left(\frac{pL}{(p-1)L+1}\right)^m + b,$$

wherein the a, the b, the m, and the p comprise rational numbers.

13. The method of claim 12, wherein the a, the b, the m, and the p comprise:

a=1.12672, b=−0.12672, m=0.14, and p=2.2;
a=1.19996, b=−0.19996, m=0.11, and p=1.1;
a=1.17053, b=−0.17053, m=0.12, and p=1.4;
a=1.14698, b=−0.14698, m=0.13, and p=1.8;
a=1.11007, b=−0.11007, m=0.15, and p=2.7;
a=1.12762, b=−0.127622, m=0.14, and p=2.3;
a=1.13014, b=−0.13014, m=0.14, and p=2.6;
a=1.11204, b=−0.112042, m=0.15, and p=3; or
a=1.09615, b=−0.0961462, m=0.16, and p=3.3.

14. The method of claim 12, wherein the a, the b, the m, and the p comprise:
a=1.2441, b=−0.2441, m=0.1, and p=1.1;
a=1.20228, b=−0.20228, m=0.11, and p=1.2;
a=1.17529, b=−0.17529, m=0.12, and p=1.7;
a=1.14933, b=−0.14933, m=0.13, and p=2;
a=1.12762, b=−0.12762, m=0.14, and p=2.3;
a=1.11204, b=−0.11204, m=0.15, and p=3; or
a=1.09615, b=−0.09615, m=0.16, and p=3.3.

15. A method for processing a high dynamic range (HDR) image by a terminal device, comprising:
obtaining, by the terminal device, input image information (L') comprising a numeric expression value of an image signal;
performing, by the terminal device, conversion processing on the L' to obtain brightness information of an image (L) comprising a value used by a display device to display a reference optical signal of the image, wherein the L is proportional to light intensity, and wherein the conversion processing comprises the following equation of:

$$L = \frac{1}{p\left(\frac{L'-b}{a}\right)^{-\frac{1}{m}} - p + 1},$$

wherein the a, the b, the m, and the p comprise rational numbers; and
displaying, by the terminal device, the L according to the brightness information.

16. The method of claim 15, wherein the a, the b, the m, and the p comprise:
a=1.12672, b=−0.12672, m=0.14, and p=2.2;
a=1.19996, b=−0.19996, m=0.11, and p=1.1;
a=1.17053, b=−0.17053, m=0.12, and p=1.4;
a=1.14698, b=−0.14698, m=0.13, and p=1.8;
a=1.11007, b=−0.11007, m=0.15, and p=2.7;
a=1.12762, b=−0.127622, m=0.14, and p=2.3;
a=1.13014, b=−0.13014, m=0.14, and p=2.6;
a=1.11204, b=−0.112042, m=0.15, and p=3; or
a=1.09615, b=−0.0961462, m=0.16, and p=3.3.

17. The method of claim 15, wherein the a, the b, the m, and the p comprise:
a=1.2441, b=−0.2441, m=0.1, and p=1.1;
a=1.20228, b=−0.20228, m=0.11, and p=1.2;
a=1.17529, b=−0.17529, m=0.12, and p=1.7;
a=1.14933, b=−0.14933, m=0.13, and p=2;
a=1.12762, b=−0.12762, m=0.14, and p=2.3;
a=1.11204, b=−0.11204, m=0.15, and p=3; or
a=1.09615, b=−0.09615, m=0.16, and p=3.3.

18. A terminal device for processing a high dynamic range (HDR) image, comprising:
a non-transitory memory comprising instructions; and
a hardware processor coupled to the non-transitory memory, wherein the instructions cause the hardware processor to be configured to:
obtain input image information (L') comprising a numeric expression value of an image signal;
perform conversion processing on the L' to obtain brightness information of an image (L) comprising a value used by a display device to display a reference optical signal of the image, wherein the L is proportional to light intensity, and wherein the conversion processing comprises the following equation of:

$$L = \frac{1}{p\left(\frac{L'-b}{a}\right)^{-\frac{1}{m}} - p + 1},$$

wherein the a, the b, the m, and the p comprise rational numbers; and
display an image according to the brightness information.

19. The terminal device of claim 18, wherein the a, the b, the m, and the p comprise:
a=1.12672, b=−0.12672, m=0.14, and p=2.2;
a=1.19996, b=−0.19996, m=0.11, and p=1.1;
a=1.17053, b=−0.17053, m=0.12, and p=1.4;
a=1.14698, b=−0.14698, m=0.13, and p=1.8;
a=1.11007, b=−0.11007, m=0.15, and p=2.7;
a=1.12762, b=−0.127622, m=0.14, and p=2.3;
a=1.13014, b=−0.13014, m=0.14, and p=2.6;
a=1.11204, b=−0.112042, m=0.15, and p=3; or
a=1.09615, b=−0.0961462, m=0.16, and p=3.3.

20. The terminal device of claim 18, wherein the a, the b, the m, and the p comprise:
a=1.2441, b=−0.2441, m=0.1, and p=1.1;
a=1.20228, b=−0.20228, m=0.11, and p=1.2;
a=1.17529, b=−0.17529, m=0.12, and p=1.7;
a=1.14933, b=−0.14933, m=0.13, and p=2;
a=1.12762, b=−0.12762, m=0.14, and p=2.3;
a=1.11204, b=−0.11204, m=0.15, and p=3; or
a=1.09615, b=−0.09615, m=0.16, and p=3.3.

* * * * *

UNITED STATES PATENT AND TRADEMARK OFFICE
CERTIFICATE OF CORRECTION

PATENT NO. : 10,783,621 B2
APPLICATION NO. : 15/986184
DATED : September 22, 2020
INVENTOR(S) : Meng Li et al.

It is certified that error appears in the above-identified patent and that said Letters Patent is hereby corrected as shown below:

In the Claims

Claim 2, Column 17, Line 8: "and r=2.3;" should read "and p=2.3;"

Claim 12, Column 18, Line 49: "device, obtaining brightness" should read "device, brightness"

Signed and Sealed this
Tenth Day of November, 2020

Andrei Iancu
*Director of the United States Patent and Trademark Office*